(12) United States Patent
Loyd

(10) Patent No.: US 7,992,549 B2
(45) Date of Patent: Aug. 9, 2011

(54) METHOD OF FUELING AN INTERNAL COMBUSTION ENGINE USING PRESSURIZED AND HEATED FUEL

(76) Inventor: Casey Loyd, Pomona, CA (US)

( * ) Notice: Subject to any disclaimer, the term of this patent is extended or adjusted under 35 U.S.C. 154(b) by 986 days.

(21) Appl. No.: 11/751,488

(22) Filed: May 21, 2007

(65) Prior Publication Data

US 2008/0289609 A1   Nov. 27, 2008

(51) Int. Cl.
*F02M 39/00* (2006.01)
(52) U.S. Cl. .................................................. 123/557
(58) Field of Classification Search .................. 123/557, 123/549
See application file for complete search history.

(56) References Cited

U.S. PATENT DOCUMENTS

| | | |
|---|---|---|
| 1,509,426 A | 9/1924 | Gregg, Jr. |
| 2,323,639 A * | 7/1943 | Anderson ..................... 123/543 |
| 2,717,827 A * | 9/1955 | Best ................................. 48/144 |
| 2,858,811 A | 11/1958 | Bede |
| 3,110,584 A | 11/1963 | Sanders, Jr., et al. |
| 3,968,775 A | 7/1976 | Harpman |
| 3,999,525 A | 12/1976 | Stumpp et al. |
| 4,023,538 A | 5/1977 | Harpman et al. |
| 4,040,393 A | 8/1977 | Decker et al. |
| 4,372,278 A | 2/1983 | Smith |
| 4,445,485 A | 5/1984 | Chamness, Jr. |
| 4,572,146 A | 2/1986 | Grunwald et al. |
| 4,665,881 A | 5/1987 | Wade |
| 4,680,110 A | 7/1987 | Davis |
| 4,683,846 A | 8/1987 | Takayasu |
| 4,708,118 A | 11/1987 | Rawlings |
| 5,033,957 A | 7/1991 | Gerstmann et al. |
| 5,386,813 A | 2/1995 | LeBlanc |
| 5,582,139 A | 12/1996 | Feuerman |
| 6,095,111 A | 8/2000 | Ueda et al. |
| 6,240,883 B1 | 6/2001 | Ahern et al. |
| 6,487,994 B2 | 12/2002 | Ahern et al. |
| 6,868,839 B2 | 3/2005 | Chu |
| 2006/0118651 A1 | 6/2006 | Kaneko et al. |
| 2006/0225425 A1 | 10/2006 | Kobayashi et al. |

* cited by examiner

*Primary Examiner* — M. McMahon
(74) *Attorney, Agent, or Firm* — Denton L. Anderson; Sheldon Mak & Anderson PC

(57) ABSTRACT

A method of operating an internal combustion engine comprises the steps of (a) pressurizing a liquid fuel to a pressure above 150 psig; (b) heating the liquid fuel to a temperature above 500° F. to produce a heated liquid fuel; (c) suddenly reducing the pressure of the heated liquid fuel sufficiently to vaporize the heated liquid fuel to form a vaporized hot fuel; (d) combining the vaporized hot fuel with oxygen to form a vaporized hot fuel/oxygen mixture; (e) introducing the vaporized hot fuel/oxygen mixture into the internal combustion engine; and (f) combusting the vaporized hot fuel/oxygen mixture within the internal combustion engine.

10 Claims, 1 Drawing Sheet

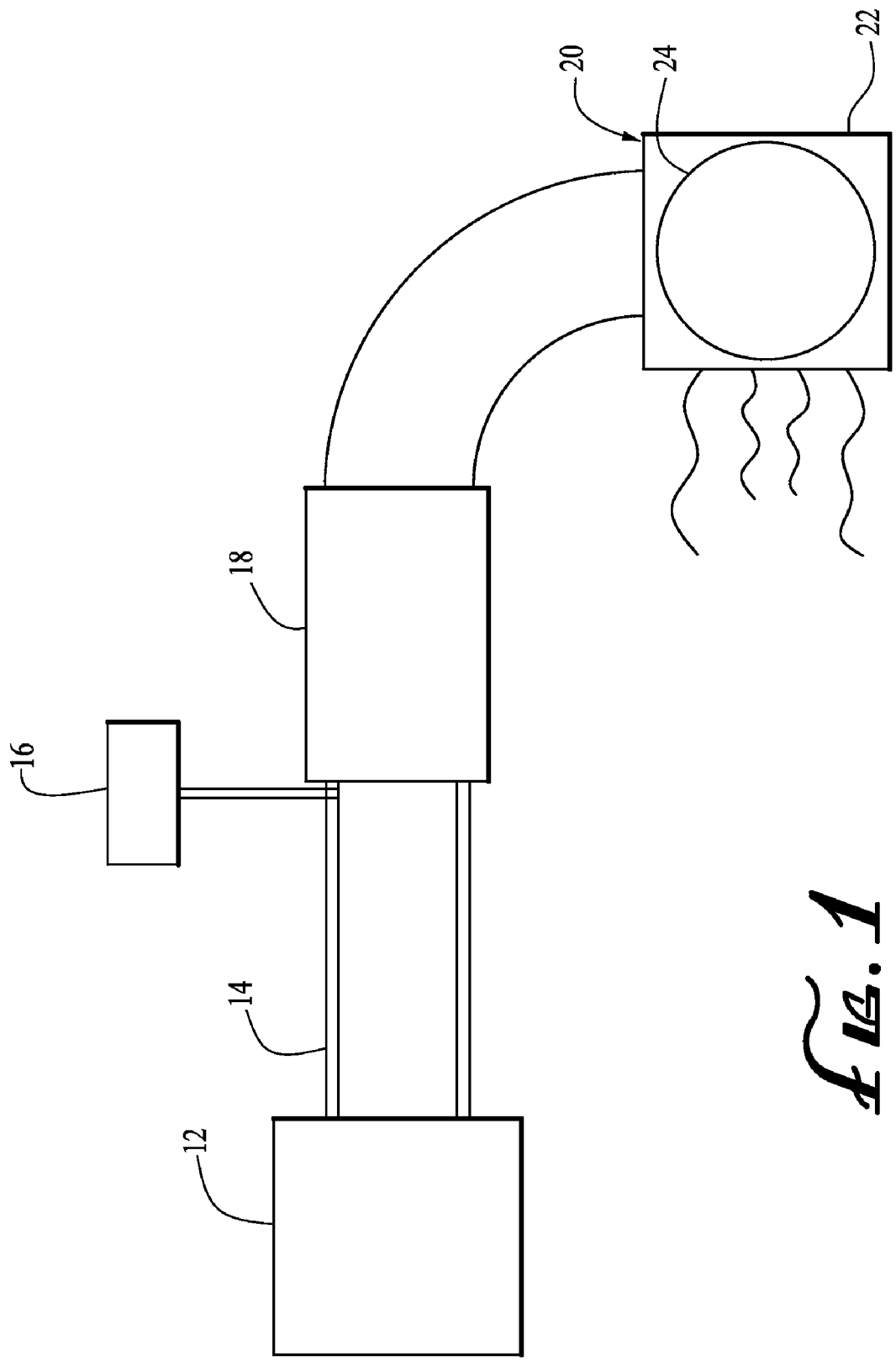

METHOD OF FUELING AN INTERNAL COMBUSTION ENGINE USING PRESSURIZED AND HEATED FUEL

FIELD OF THE INVENTION

This invention relates generally to internal combustion engines and, more specifically, to methods of providing fuel to internal combustion engines.

BACKGROUND

As the concerns for petroleum reserves, national petroleum dependency and petroleum combustion air pollution mount, the quest for increasing the efficiency of internal combustion engines intensifies.

It is well-known that the conventional burning of liquid fuels within internal combustion engines is far from efficient. A large percentage of liquid fuel introduced into a conventional internal combustion engine passes through the engine unburned or only partially burned.

Accordingly, there is an urgent need for methods of operating an internal combustion engine which markedly increase the fuel efficiency of such internal combustion engines.

SUMMARY

The invention satisfies this need. The invention is a method of operating an internal combustion engine comprising the steps of (a) pressurizing a liquid fuel to a pressure above 150 psig; (b) heating the liquid fuel to a temperature above 500° F. to produce a heated liquid fuel; (c) suddenly reducing the pressure of the heated liquid fuel sufficiently to vaporize the heated liquid fuel to form a vaporized hot fuel; (d) combining the vaporized hot fuel with oxygen to form a vaporized hot fuel/oxygen mixture; (e) introducing the vaporized hot fuel/oxygen mixture into the internal combustion engine; and (f) combusting the vaporized hot fuel/oxygen mixture within the internal combustion engine.

The invention is also an internal combustion engine having a fuel introduction system comprising (a) a pump for pressurizing liquid fuel to a pressure above about 150 psig; (b) an in-line heater for heating a liquid fuel to a temperature above 500° F. to produce a heated liquid fuel; (c) an in-line valve or orifice for suddenly reducing the pressure sufficiently to vaporize the heated liquid fuel; (d) mixing means for mixing the heated liquid fuel with oxygen to form a vaporized hot fuel/oxygen mixture and for introducing the vaporized hot fuel/oxygen mixture into the internal combustion engine.

DRAWINGS

These and other features, aspects and advantages of the present invention will become better understood with reference to the following description, appended claims and accompanying drawings where:

FIG. 1 is a flow diagram of a method for operating an internal combustion engine having features of the invention.

DETAILED DESCRIPTION

The following discussion describes in detail one embodiment of the invention and several variations of that embodiment. This discussion should not be construed, however, as limiting the invention to those particular embodiments. Practitioners skilled in the art will recognize numerous other embodiments as well.

The invention is a method of operating an internal combustion engine comprising the steps of (a) pressurizing a liquid fuel to a pressure above 150 psig; (b) heating the liquid fuel to a temperature above 500° F. to produce a heated liquid fuel; (c) suddenly reducing the pressure of the heated liquid fuel sufficiently to vaporize the heated liquid fuel to form a vaporized hot fuel; (d) combining the vaporized hot fuel with oxygen to form a vaporized hot fuel/oxygen mixture; (e) introducing the vaporized hot fuel/oxygen mixture into the internal combustion engine; and (f) combusting the vaporized hot fuel/oxygen mixture within the internal combustion engine.

Typically, the liquid fuel used in the fuel introduction system 10 of the invention is gasoline, but other liquid fuels and fuel mixtures, including alcohols, light naphtas and kerosenes can be used as well.

Typically, the liquid fuel is pressurized with a pump 12 in step (a) to a pressure between about 150 psig and about 600 psig, more typically between about 250 psig and about 500 psig, and most typically between about 350 psig and about 450 psig.

The heating of the liquid fuel in step (b) can be conveniently accomplished using an in-line electrical heater 14. The electrical heater 14 can be controlled by a controller 16 which senses the temperature of the fuel exiting the electrical heater 14 and adjusts the heating within the electrical heater 14 accordingly.

Typically, the liquid fuel is heated in step (b) to a temperature between about 500° F. and about 800° F., more typically between about 600° F. and about 700° F.

The pressure of the heated liquid fuel is suddenly reduced in step (c) across an expansion valve, orifice or other expansion means 18 disposed within the fuel line. Typically, the pressure of the heated fuel is suddenly reduced in step (c) to a pressure between about 20 psig and about 60 psig.

The oxygen used to combine with the vaporized hot fuel in step (d) is typically atmospheric air. Bottled oxygen and oxygen-containing mixtures can also be used.

The mixing of the oxygen with the vaporized hot fuel and the introduction of a vaporized hot fuel/oxygen mixture into the internal combustion engine can be accomplished via mixing means 20, such as a carburetor or a fuel injection system, the designs of which are well-known to those of skill in the art.

In one embodiment of the invention, the combining of the vaporized hot fuel with oxygen to form a vaporized hot fuel/oxygen mixture in step (d) is performed within a mixing chamber 22, and the introduction of the vaporized hot fuel/oxygen mixture into the internal combustion engine in step (e) is accomplished via an intake manifold 24. To increase the safety of the fuel introduction system, the intake manifold 24 can be encapsulated within the mixing chamber 22 so that leaks within the intake manifold 24 are retained by the structure of the mixing chamber 22.

The invention results in an internal combustion engine with markedly increased fuel efficiency over ordinary internal combustion engines of the prior art. Whereas as much as 40% of the fuel introduced to conventional engines passes through the engine uncombusted or only partially combusted, typically greater than 95% of the fuel introduced into internal combustion engines employing the invention are completely combusted.

Having thus described the invention, it should be apparent that numerous structural modifications and adaptations may be resorted to without departing from the scope and fair meaning of the instant invention as set forth hereinabove.

What is claimed is:

1. A fuel introduction system for an internal combustion engine comprising:
   (a) a pump for pressurizing liquid fuel to a pressure above about 150 psig;
   (b) an in-line heater for heating a liquid fuel to a temperature above 500° F. to produce a heated liquid fuel;
   (c) an in-line valve or orifice for suddenly reducing the pressure sufficiently to vaporize the heated liquid fuel;
   (d) a mixing chamber disposed upstream of the internal combustion engine for mixing the vaporized heated fuel with oxygen to form a vaporized hot fuel/oxygen mixture and for introducing the vaporized hot fuel/oxygen mixture into the internal combustion engine.

2. The fuel introduction system of claim 1 wherein the pump is adapted to pressurize gasoline to a pressure between about 150 psig and about 600 psig.

3. The fuel introduction system of claim 1 wherein the pump is adapted to pressurize gasoline to a pressure between about 250 psig and about 500 psig.

4. The fuel introduction system of claim 1 wherein the pump is adapted to pressurize gasoline to a pressure between about 350 psig and about 450 psig.

5. The fuel introduction system of claim 1 wherein in-line heater is adapted to heat gasoline to a temperature between about 500° F. and about 800° F.

6. The fuel introduction system of claim 1 wherein in-line heater is adapted to heat gasoline to a temperature between about 600° F. and about 600° F.

7. The fuel introduction system of claim 1 wherein the in-line valve orifice is adapted to suddenly reduce the pressure of gasoline from the in-line heater to a pressure between about 20 psig and about 60 psig.

8. The fuel introduction system of claim 1 wherein the intake manifold of an internal combustion engine is encapsulated within the mixing chamber.

9. An internal combustion engine having a fuel introduction system comprising:
   (a) a pump for pressurizing liquid fuel to a pressure above about 150 psig;
   (b) an in-line heater for heating a liquid fuel to a temperature above 500° F. to produce a heated liquid fuel;
   (c) an in-line valve or orifice for suddenly reducing the pressure sufficiently to vaporize the heated liquid fuel;
   (d) a mixing chamber disposed upstream of the internal combustion engine for mixing the vaporized heated fuel with oxygen to form a vaporized hot fuel/oxygen mixture and for introducing the vaporized hot fuel/oxygen mixture into the internal combustion engine.

10. The internal combustion engine of claim 9 wherein the pump, heater, in-line valve or orifice and the mixing chamber are adapted to introduce gasoline into the internal combustion engine, wherein the internal combustion engine comprises an intake manifold, and wherein the intake manifold is encapsulated within the mixing chamber.

* * * * *